(12) United States Patent
Bilges et al.

(10) Patent No.: US 8,102,067 B2
(45) Date of Patent: Jan. 24, 2012

(54) METHOD FOR THE OPERATION OF A WIND ENERGY PLANT HAVING A WIND VELOCITY MEASUREMENT DEVICE

(75) Inventors: Sören Bilges, Hamburg (DE); Holger Schwarze, Hamburg (DE)

(73) Assignee: Nordex Energy GmbH, Norderstedt (DE)

(*) Notice: Subject to any disclaimer, the term of this patent is extended or adjusted under 35 U.S.C. 154(b) by 532 days.

(21) Appl. No.: 12/366,305

(22) Filed: Feb. 5, 2009

(65) Prior Publication Data
US 2010/0052321 A1    Mar. 4, 2010

(30) Foreign Application Priority Data

Aug. 27, 2008 (DE) .......................... 10 2008 044 652

(51) Int. Cl.
*F03D 9/00* (2006.01)
(52) U.S. Cl. ............................................. 290/44; 290/55
(58) Field of Classification Search .................. 290/44, 290/55
See application file for complete search history.

(56) References Cited

U.S. PATENT DOCUMENTS

| | | | |
|---|---|---|---|
| 6,850,821 B2 * | 2/2005 | Weitkamp | 700/286 |
| 2005/0276696 A1 | 12/2005 | LeMieux | |
| 2009/0012724 A1 * | 1/2009 | Voss et al. | 702/34 |

FOREIGN PATENT DOCUMENTS

| | | |
|---|---|---|
| DE | 101 13 038 A1 | 2/2002 |
| DE | 101 57 759 C1 | 1/2003 |
| DE | 10 2004 051843 A1 | 4/2006 |
| DE | 20 2006 000 816 U1 | 4/2006 |
| EP | 0 913 746 A2 | 5/1999 |
| EP | 1674724 A2 * | 12/2005 |
| EP | 2014916 A2 * | 3/2008 |
| EP | 1 906 192 A2 | 4/2008 |
| GB | 2 023 237 A | 12/1979 |

OTHER PUBLICATIONS

"Richtlinie fur Die Zertifizierung Von Windenergieanlagen" Germanischen Lloyd Ausabe 2003 mit Erganzung 2004 in Kapital 2, Abschnitt 2.3.2.4.2.

* cited by examiner

*Primary Examiner* — Tho D Ta
(74) *Attorney, Agent, or Firm* — Vidas, Arrett & Steinkraus, P.A.

(57) ABSTRACT

A method for the operation of a wind energy plant, which features a wind velocity measurement device and a device for the detection of a mechanical load, with the following steps: measuring a wind velocity with the wind velocity measurement device, detecting a mechanical load with the device for the detection of a mechanical load, determining an estimated value for the wind velocity, based on the determined mechanical load, comparing the wind velocity measured by means of the wind velocity measurement device with the estimated value.

22 Claims, 2 Drawing Sheets

METHOD FOR THE OPERATION OF A WIND ENERGY PLANT HAVING A WIND VELOCITY MEASUREMENT DEVICE

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a method for the operation of a wind energy plant having a wind velocity measurement device, and to such a wind energy plant.

In the operation of wind energy plants, the wind velocity is a measured variable with a central influence on the capacity, the possible modes of operation and regulation and of the occurring loads of the wind energy plant. A reliable and accurate measurement of the wind velocity is of commensurate importance. Various types of wind velocity measurement devices are used, which are also designated as anemometers. They are in most cases disposed on the nacelle of the wind energy plant. A problem which can in principle be encountered by all wind velocity measurement devices is the monitoring of the measurement operation, i.e. to recognise a malfunction of the wind velocity measurement device. Erroneous measurement results may be caused by influences of the atmospheric conditions for instance, e.g. through icing of parts of the measurement device or other impurities. The requirements which the wind velocity measurement device must fulfil for a certification are deposited in the "Richtlinie für die Zertifizierung von Windenergieanlagen" of the Germanischer Lloyd, Ed. 2003 with supplement 2004 in chapter 2, paragraph 2.3.2.4.2, the entire contents of which is incorporated herein by reference.

Starting from these problems, the document DE 101 57 759 C1, the entire contents of which is incorporated herein by reference, proposes to correlate the measured wind velocity with additional operation parameters of the wind energy plant in a wind energy plant. Concretely, it is checked whether the power generated by the wind energy plant or a blade pitch angle resulting from the regulation of the wind energy plant is in a plausible interrelationship with the measured wind velocity. When this is not the case, an error of the anemometer is deduced.

Starting from this, it is the objective of the present invention to provide a method for the operation of a wind energy plant having a wind velocity measurement device, and such a wind energy plant which permit(s) an improved plausibility check of the measured wind velocity.

BRIEF SUMMARY OF THE INVENTION

The method according to the present invention serves for the operation of a wind energy plant, which features a wind velocity measurement device and a device for the detection of a mechanical load, and it comprises the following steps: measuring a wind velocity with the wind velocity measurement device, detecting a mechanical load with the device for the detection of a mechanical load, determining an estimated value for the wind velocity, based on the detected mechanical load, comparing the wind velocity measured by means of the wind velocity measurement device with the estimated value.

It will be appreciated that the indicated steps are not necessarily to be performed in the above order, in particular, the measurement of the wind velocity and the detection of the mechanical load and the determination of the estimated value can take place in parallel.

The present invention is based on the finding that the mechanical loads occurring in the operation of a wind energy plant present a certain interrelationship with the wind velocity acting on the wind energy plant, which can be analysed for a plausibility check.

The device for the detection of a mechanical load is a measurement device which provides information about the magnitude of a mechanical load or stress of the wind energy plant or of one of its components, for instance by detection of a deformation of an assembly part with a strain gauge, or by detection of a movement with a position—or acceleration sensor. The mechanical load can be detected or scanned continuously over a certain period of time or permanently. The mechanical load can be detected on different components of the wind energy plant, e.g. on the tower, in the nacelle or on the rotor blades.

Based on the detected mechanical load, an estimated value for the wind velocity is determined. For this purpose, the already known or previously determined interrelationship between the mechanical load and the wind velocity is analysed. The wind velocity measured by the wind velocity measurement device remains unconsidered in the determination of the estimated value.

In a further procedural step, the estimated value is compared with the measured value for the wind velocity. The result of the comparison permits conclusions concerning the regular function of the wind velocity measurement device.

The present invention permits the determination of an estimated value for the wind velocity, based on the detection of one single measured variable for a mechanical load over the complete operation range of the wind energy plant, i.e. over a greater range of wind velocities than with known procedures, which have hitherto discriminated between an operation at rated wind, in which the electric power generated by the wind energy plant is analysed, and an operation at more than rated wind, in which the pitch angle is analysed. In doing so, the second method can not be applied before the pitch regulation intervenes. Through this, a problematic gap in the plausibility check can occur at rated wind, according to the circumstances.

Furthermore, the present invention provides a determination of the estimated value which is independent from the measured wind velocity. In particular, no discrimination between an operation at rated wind and an operation at more than rated wind is necessary.

For these reasons, the present invention can permit a plausibility check which is more reliable, and independent from the wind velocity measurement to be monitored. Even the accuracy of the estimated value can be improved, according to the circumstances.

In one embodiment, the device for the detection of a mechanical load is an acceleration sensor. The acceleration detected at one point of the wind energy plant is a measure for a mechanical load, because the acceleration is linked immediately to the movement or deformation on that point of the wind energy plant, which are occurring as a result of the forces acting on the wind energy plant. The utilisation of acceleration sensors is known in wind energy plants for vibration monitoring, for instance from the document DE 10113 038 C2, the entire contents of which is incorporated herein by reference. In this known utilisation of an acceleration sensor, the vibration frequencies and the vibration amplitudes in the nacelle of the wind energy plant are monitored in view of exceeding a preset limit value, in order to avoid an overload of the tower of the wind energy plant. The utilisation of an acceleration sensor permits a particularly accurate and reliable measurement of the mechanical load even for longer periods of operation. Further, modern wind energy plants often have already such sensors, so that no additional detection devices are necessary to utilise the method of the present invention.

Preferably, the acceleration sensor is disposed in the nacelle of the wind energy plant. The accelerations measured in the nacelle are the greatest ones, because the vibration amplitude is at maximum there, and therefore they can be detected particularly accurately. Further, the nacelle is always oriented towards the wind direction in the operation of the wind energy plant, which simplifies the detection of an acceleration which correlates strongly with the wind velocity.

In one embodiment, the acceleration sensor measures the acceleration perpendicular to the rotor plane. Through this, that acceleration occurring in the wind direction during the operation of the wind energy plant (in wind energy plants with horizontal rotor axis) is detected which correlates most with the wind velocity.

In a further embodiment, the determination of the estimated value comprises an averaging of the detected load values over time. The averaging over a suitable period of time makes sense in order to add out momentary loads which are not correlated to the wind velocity or to that average wind velocity over a longer period of time, which is applicable for shut-down or monitoring, respectively, like load peaks occurring during a vibration movement, for instance. In particular, a floating time window can be selected for the averaging.

In a further embodiment, the determination of the estimated value comprises the calculation of a standard deviation of the load values detected in a certain interval of time, when indicated in a floating reference time interval. The calculation of the standard deviation is performed by forming the geometric mean value of the square deviation of the measured values from an average value. Experiments have proven that the standard deviation of the measured values for the detected mechanical load features a high correlation with the wind velocity. Therefore, it provides a particularly well suited starting point for the determination of the estimated value for the wind velocity.

In one embodiment, the determination of the estimated value takes into account additional parameters of operation and surroundings. Amongst others, the same may be the density of the air, the type of the wind energy plant or the type of the tower used of the wind energy plant, the direction of approach or the turbulence intensity occurring at the location of the wind energy plant. The mentioned parameters influence the mechanical loads occurring at a certain wind velocity. For instance, the mechanical load increases with the air density at constant wind velocity. The mathematical consideration of such interrelationships in the determination of the estimated value leads to a higher accuracy of the estimated value.

According to one embodiment, the determination of the estimated value uses an interrelationship between load value and wind velocity which is specific for the location and/or the type of the plant. This specific interrelationship can include influencing variables of the plant's type in particular, but also peculiar conditions of the location, for instance location-induced turbulences of the airflow. The specific interrelationship can be determined by simulation calculations or by measurements on the location, for instance. Preferably, additional changing surroundings parameters, like the air density e.g., are taken into consideration, in addition to the interrelationship which is specific for the location and/or the type of the plant.

According to one embodiment, an error interval is determined for a determined estimated value. The determination of the error interval permits a simple evaluation of the deviation of the measured value for the wind velocity from the estimated value. Alternatively, the error interval can also be preset as to be fixed.

In one embodiment, the error interval depends on additional parameters. Thus, for each estimated value a specific error interval is preset. For instance, the magnitude of the estimated value, the course in time of the determined estimated values or the constancy of the wind velocity can be taken into account. Through this, the conclusion of a malfunction of the wind velocity measurement device can be made to depend on the accuracy of the determined estimated value which is to be expected. Under conditions which are favourable for the determination of the estimated value, a smaller deviation of the measured wind velocity can already be identified as a measurement error, whereas under conditions which are unfavourable for the determination of the estimated value, a premature conclusion of an error of the wind velocity measurement device is avoided.

According to a further embodiment, an error message is emitted and/or the operation management of the wind energy plant intervenes in the operation of the plant and/or shuts down the wind energy plant, when a deviation of the estimated value from the measured wind velocity exceeds a certain absolute value and/or the measured wind velocity is outside of the error interval. By the error message, a service procedure may be initiated for instance, which comprises a maintenance of the wind velocity measurement device.

Advantageous embodiments are indicated in the subsequent subclaims. The wind energy plant according to the present invention has a wind velocity measurement device, a device for the detection of a mechanical load, a device for the determination of an estimated value for the wind velocity, based on the determined mechanical load, and a comparison device, which can compare the wind velocity measured by means of the wind velocity measurement device with the estimated value.

The wind energy plant according to the present invention is suitable for practising the method of the present invention. As for details and with respect to the subclaims, reference is made to the explanation of the method.

BRIEF DESCRIPTION OF THE SEVERAL VIEWS OF THE DRAWINGS

In the following, the present invention is explained by means of an example of its realisation represented in figures.

DETAILED DESCRIPTION OF THE INVENTION

Figure 1:
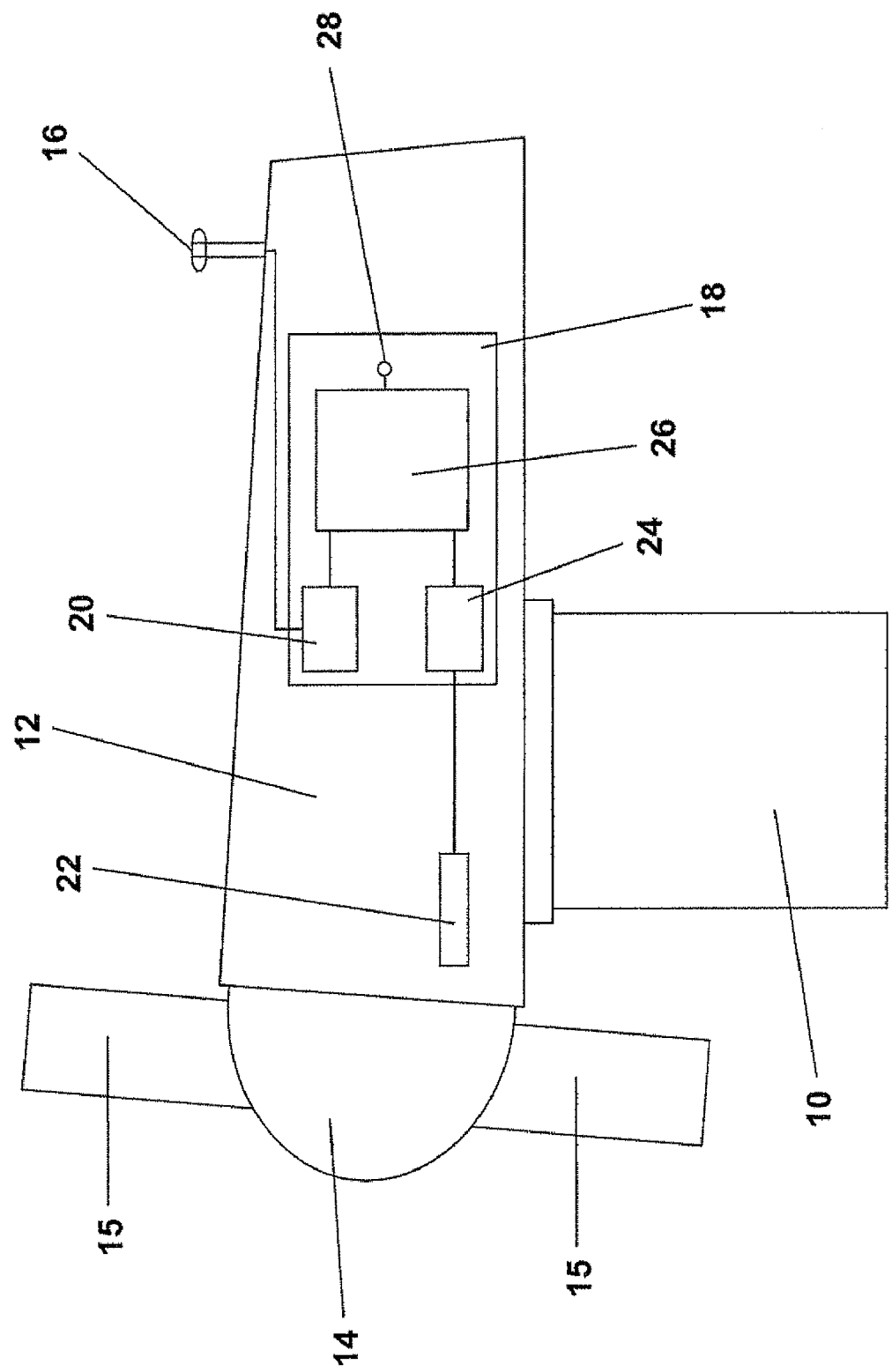
FIG. 1 shows a wind energy plant according to the present invention in a simplified, schematic representation.

While this invention may be embodied in many different forms, there are described in detail herein a specific preferred embodiment of the invention. This description is an exemplification of the principles of the invention and is not intended to limit the invention to the particular embodiment illustrated The wind energy plant depicted in FIG. 1 features a tower 10, a nacelle 12 and a rotor 14 with rotor blades 15. The rotor 14 has a not shown, horizontally arranged axis and for providing electric energy, it drives via a not shown gearbox an also not shown generator. The wind energy plant has a wind velocity measurement device 16 in the form of an anemometer. The signal generated by the wind velocity measurement device 16 is forwarded to the operation management 18 of the wind energy plant and there it is analysed by an analysing unit 20.

In the interior of the nacelle 12 of the wind energy plant, an acceleration sensor 22 is arranged, which detects the acceleration of the nacelle 12 in a direction essentially perpendicular to the plane defined by the rotor blades 15. The acceleration signal of the acceleration sensor 22 is forwarded to the operation management 18 of the wind energy plant and there it is analysed by the device 24 for the determination of an estimated value. For this purpose, the device 24 for the determination of an estimated value calculates the standard deviation of the detected acceleration values over a certain, floating interval of time with 10 minutes duration, for instance. Using a location-specific interrelationship between the acceleration values and the wind velocity, which is stored in the operation management 18, the device 24 for the determination of an estimated value assigns an estimated value for the wind velocity to the calculated standard deviation of the detected acceleration values.

The estimated value for the wind velocity is forwarded to the comparison device 26 for the purpose of a plausibility check, and there it is compared with the measured wind velocity which was also forwarded to comparison device 26. In case that the deviation between the estimated value and the measured wind velocity exceeds a preset value, or the measured wind velocity is significantly outside an error interval which is preset or determined by the device 24 for the determination of an estimated value, respectively, the comparison device 26 emits an error message, as adumbrated at 28. When indicated, the wind energy plant may be shut down thereafter.

Figure 2:
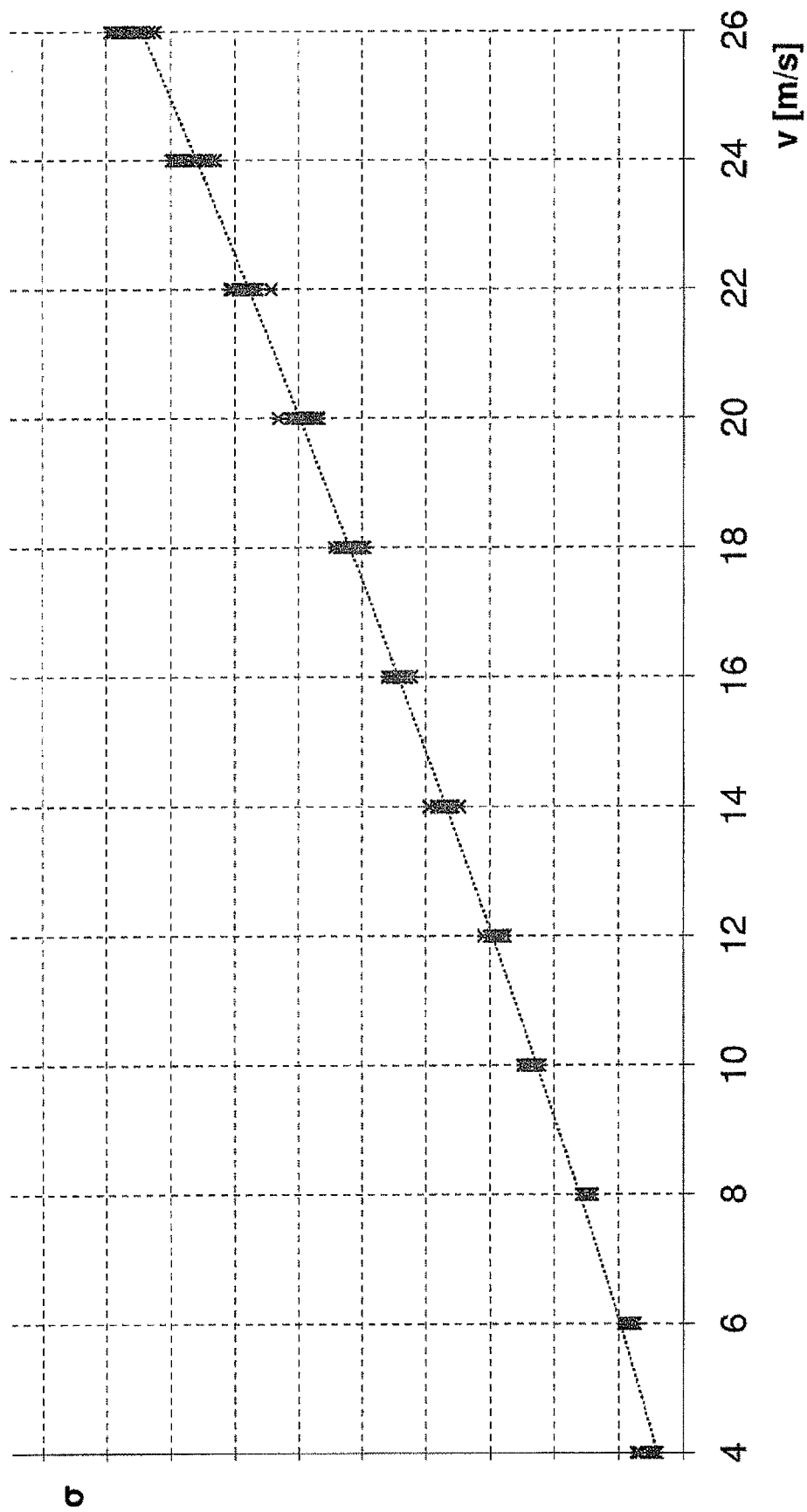
FIG. 2 shows a diagram concerning the interrelationship between wind velocity and mechanical load.

FIG. 2 shows in a diagram an interrelationship between average values over 10 minutes of the wind velocity v, plotted on the abscissa, and standard deviations σ of the acceleration of the nacelle of the wind energy plant, plotted on the ordinate, determined in a simulation calculation for the corresponding intervals of time. A continuous, monotonically increasing interrelationship with points for the standard deviation σ of the acceleration is noticed, which are closely neighbouring each other for each average value of the wind velocity, and which represent the results of the individual simulation processes. This shows the strong correlation of the two variables, which permits a reliable and accurate estimation of the wind velocity based on the mechanical load of the wind energy plant, which is detected in the form of the acceleration values. It will be understood that the wind velocity range selected for the figure, on which the simulation calculation was based, was chosen arbitrarily and is not intended to form a limitation of the method.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for the operation of a wind energy plant, which comprises a wind velocity measurement device (16) and a device for the detection of a mechanical load of a component of the wind energy plant, comprising the following steps:
    measuring a wind velocity with the wind velocity measurement device (16);
    detecting a mechanical load of the component of the wind energy plant with the device (22) for the detection of a mechanical load;
    assigning an estimated value for the wind velocity using a device (24) for the determination of an estimated value for a wind velocity, based on the detected mechanical load of the component of the wind energy plant;
    forwarding the estimated value and the measured wind velocity to a comparison device (26); and
    comparing the measured wind velocity with the estimated value using the comparison device for the purpose of plausibility check;
    wherein said component of the wind energy plant is a nacelle (12), and wherein said detected mechanical load is determined by detecting an acceleration of the nacelle.

2. A method according to claim 1, characterised in that the device for the detection of a mechanical load is an acceleration sensor (22).

3. A method according to claim 2, characterised in that the acceleration sensor (22) is disposed in the nacelle (12) of the wind energy plant.

4. A method according to claim 2, characterised in that the acceleration sensor (22) measures the acceleration perpendicular to the rotor plane of the wind energy plant.

5. A method according to any claim 1, characterised in that the determination of the estimated value comprises an averaging of the detected load values over time.

6. A method according to claim 1, characterised in that the determination of the estimated value comprises the calculation of a standard deviation of the detected load values, when indicated in a floating reference time interval.

7. A method according to claim 1, characterised in that the determination of the estimated value takes into account additional parameters of operation and surroundings.

8. A method according to claim 1, characterised in that the determination of the estimated value uses an interrelationship between load value and wind velocity which is specific for the location and/or for the type of the plant.

9. A method according to claim 1, characterised in that an error interval is determined for a determined estimated value.

10. A method according to claim 9, characterised in that the error interval depends on additional parameters.

11. A method according to claim 9, characterised in that an error message (28) is emitted and/or the operation management (18) of the wind energy plant intervenes in the operation of the plant and/or shuts down the wind energy plant, when a deviation of the estimated value from the measured wind velocity exceeds a certain absolute value and/or the measured wind velocity is outside of the error interval.

12. A wind energy plant comprising:
a wind velocity measurement device (16);
a device (22) for the detection of a mechanical load of a component of the wind energy plant;
a device (24) for the determination of an estimated value for a wind velocity, based on the detected mechanical load of the component of the wind energy plant; and
a comparison device (26), which compares the wind velocity measured by means of the wind velocity measurement device (16) with the estimated value for the purpose of plausibility check;
wherein said component of the wind energy plant is a nacelle (12), and wherein said detected mechanical load is determined by detecting an acceleration of the nacelle.

13. A wind energy plant according to claim 12, characterised in that the device for the detection of a mechanical load is an acceleration sensor (22).

14. A wind energy plant according to claim 13, characterised in that the acceleration sensor (22) is disposed in the nacelle (12) of the wind energy plant.

15. A wind energy plant according to claim 13, characterised in that the acceleration sensor (22) is disposed such that it measures the acceleration perpendicular to the rotor plane.

16. A wind energy plant according to claim 12, characterised in that the device for the determination of the estimated value (24) can perform an averaging of the detected load values over time.

17. A wind energy plant according to claim 12, characterised in that the device for the determination of the estimated value (24) can calculate a standard deviation of the detected load values, when indicated referring to a floating reference time interval.

18. A wind energy plant according to claim 12, characterised in that the device for the determination of the estimated value (24) can take into account additional parameters of operation and surroundings.

19. A wind energy plant according to claim 12, characterised in that an interrelationship between load value and wind velocity, which is specific for the location and/or for the type of the plant, is stored in the wind energy plant, which can be used by the device for the determination of the estimated value (24).

20. A wind energy plant according to claim 12, characterised in that the device for the determination of the estimated value (24) comprises a device for the determination of an error interval, which can determine an error interval for a determined estimated value.

21. A wind energy plant according to claim 20, characterised in that the device for the determination of an error interval can take into account additional parameters.

22. A wind energy plant according to claim 20, characterised in that the comparison device (26) can emit an error message (28) and/or the operation management of the wind energy plant can intervene in the operation of the plant and/or the wind energy plant can be shut down, when the comparison device (26) states that a deviation of the estimated value from the measured wind velocity exceeds a certain absolute value and/or that the measured wind velocity is outside of the error interval.

* * * * *